(12) United States Patent
Boyd et al.

(10) Patent No.: US 12,587,712 B2
(45) Date of Patent: Mar. 24, 2026

(54) VIDEO SOUND CONTROL

(71) Applicant: Snap Inc., Santa Monica, CA (US)

(72) Inventors: Nathan Kenneth Boyd, Los Angeles, CA (US); Jacob Catalano, Burlington (CA); Imani Ritchards, Los Angeles, CA (US); Ian Anthony Wehrman, Venice, CA (US); Nikhil Halkude, Fremont, CA (US)

(73) Assignee: Snap Inc., Santa Monica, CA (US)

( * ) Notice: Subject to any disclaimer, the term of this patent is extended or adjusted under 35 U.S.C. 154(b) by 150 days.

(21) Appl. No.: 18/156,276

(22) Filed: Jan. 18, 2023

(65) Prior Publication Data

US 2024/0244298 A1 Jul. 18, 2024

(51) Int. Cl.
| | |
|---|---|
| *H04N 21/485* | (2011.01) |
| *G06F 3/16* | (2006.01) |
| *H04N 21/439* | (2011.01) |
| *H04N 21/472* | (2011.01) |

(52) U.S. Cl.
CPC ......... *H04N 21/4852* (2013.01); *G06F 3/165* (2013.01); *H04N 21/4396* (2013.01); *H04N 21/47217* (2013.01)

(58) Field of Classification Search
CPC ........... H04N 21/4852; H04N 21/4396; H04N 21/47217; G06F 3/165
See application file for complete search history.

(56) References Cited

U.S. PATENT DOCUMENTS

| | | | |
|---|---|---|---|
| 10,965,888 B1 * | 3/2021 | Boyd ..................... | G06F 3/165 |
| 11,290,661 B2 | 3/2022 | Boyd et al. | |
| 11,695,899 B2 | 7/2023 | Boyd et al. | |
| 12,143,747 B2 | 11/2024 | Boyd et al. | |
| 2002/0154246 A1 | 10/2002 | Hawkins | |
| 2003/0027121 A1 | 2/2003 | Grudnitski et al. | |
| 2005/0038661 A1 | 2/2005 | Momosaki et al. | |
| 2005/0129252 A1 | 6/2005 | Heintzman et al. | |
| 2006/0044479 A1 | 3/2006 | Heo | |
| 2007/0220021 A1 | 9/2007 | Kato et al. | |
| 2007/0245374 A1 | 10/2007 | Wu | |

(Continued)

OTHER PUBLICATIONS

"U.S. Appl. No. 16/674,913, Non Final Office Action mailed Apr. 30, 2020", 9 pgs.

(Continued)

*Primary Examiner* — Girumsew Wendmagegn
(74) *Attorney, Agent, or Firm* — Schwegman Lundberg & Woessner, P.A.

(57) ABSTRACT

Systems and methods are provided for presenting videos. The systems and methods access a video playback graphical user interface (GUI) that automatically plays back a plurality of videos in sequence. The systems and methods determine, by the one or more processors, a current mute state of the video playback GUI, a disabled mute state allowing output of audio associated with the playback of the plurality of videos, and an enabled mute state preventing the output of the audio associated with the playback of the plurality of videos. The systems and methods conditionally present an indicator that visually informs a user that audio is currently in the enabled mute state while an individual video of the plurality of videos is being played back based on the current mute state of the GUI.

20 Claims, 10 Drawing Sheets

(56)　　　　　References Cited

U.S. PATENT DOCUMENTS

| | | |
|---|---|---|
| 2010/0229078 A1 | 9/2010 | Otsubo et al. |
| 2012/0084650 A1 | 4/2012 | Uchimura |
| 2013/0073962 A1 | 3/2013 | Pendergast et al. |
| 2015/0370402 A1 | 12/2015 | Checkley et al. |
| 2016/0133298 A1 | 5/2016 | Zhou |
| 2016/0170709 A1 | 6/2016 | Jang et al. |
| 2020/0084505 A1 | 3/2020 | Reid et al. |
| 2021/0185244 A1 | 6/2021 | Boyd et al. |
| 2022/0182558 A1 | 6/2022 | Boyd et al. |
| 2022/0239987 A1* | 7/2022 | Gauglitz ............ H04N 21/2743 |
| 2023/0262286 A1* | 8/2023 | Li ......................... H04N 21/431 |
| | | 348/564 |
| 2023/0300286 A1 | 9/2023 | Boyd et al. |

OTHER PUBLICATIONS

"U.S. Appl. No. 16/674,913, Response filed Jul. 13, 2020 to Non Final Office Action mailed Apr. 30, 2020", 10 pgs.

"U.S. Appl. No. 16/674,913, Final Office Action mailed Aug. 13, 2020", 12 pgs.

"U.S. Appl. No. 16/674,913, Examiner Interview Summary mailed Oct. 9, 2020", 3 pgs.

"U.S. Appl. No. 16/674,913, Response filed Oct. 13, 2020 to Final Office Action mailed Aug. 13, 2020", 11 pgs.

"U.S. Appl. No. 16/674,913, Notice of Allowance mailed Nov. 27, 2020", 13 pgs.

"U.S. Appl. No. 17/183,868, Non Final Office Action mailed Sep. 2, 2021", 13 pgs.

"U.S. Appl. No. 17/183,868, Response filed Nov. 16, 2021 to Non Final Office Action mailed Sep. 2, 2021", 10 pgs.

"U.S. Appl. No. 17/183,868, Notice of Allowance mailed Nov. 29, 2021", 5 pgs.

"U.S. Appl. No. 17/679,742, Non Final Office Action mailed Oct. 6, 2022", 12 pgs.

"U.S. Appl. No. 17/679,742, Response filed Dec. 13, 2022 to Non Final Office Action mailed Oct. 6, 2022", 9 pgs.

"U.S. Appl. No. 17/679,742, Notice of Allowance mailed Feb. 22, 2023", 6 pgs.

"U.S. Appl. No. 18/321,531, Non Final Office Action mailed Feb. 15, 2024", 13 pgs.

"U.S. Appl. No. 18/321,531, Notice of Allowance mailed Jul. 9, 2024", 5 pgs.

"U.S. Appl. No. 18/321,531, Response filed Apr. 29, 2024 to Non Final Office Action mailed Feb. 15, 2024", 9 pgs.

U.S. Appl. No. 16/674,913, U.S. Pat. No. 10,965,588, filed Nov. 5, 2019, Subtitle Presentation Based on Volume Control.

U.S. Appl. No. 17/183,868, U.S. Pat. No. 11,290,661, filed Feb. 24, 2021, Subtitle Presentation Based on Volume Control.

U.S. Appl. No. 17/679,742, U.S. Pat. No. 11,695,899, filed Feb. 24, 2022, Subtitle Presentation Based on Volume Control.

U.S. Appl. No. 18/321,531, U.S. Pat. No. 12,143,747, filed May 22, 2023, Subtitle Presentation Based on Volume Control.

"Bidirectionality Material Design", [Online]. Retrieved from the Internet: <https://m2.material.io/design/usability/bidirectionality.html#mirroring-layout>, (2022), 45 pgs.

"Make Apps More Accessible", [Online]. Retrieved from the Internet: <https://developer.android.com/guide/topics/ui/accessibility/apps>, (2022), 4 pgs.

"Office for Digital Accessibility", [Online]. Retrieved from the Internet: <https://accessibility.umn.edu/getting-started/learn-7-core-accessibility-skills/alternative-text>, (2022), 13 pgs.

"Supporting VoiceOver in Your App", [Online]. Retrieved from the Internet: <https://developer.apple.com/documentation/uikit/supporting-voiceover-in-your-app>, (2022), 6 pgs.

"Contrast Checker", WebAIM, web accessibility in mind, [Online]. Retrieved from the Internet: <URL: https://web.archive.org/web/20230115193313/https://webaim.org/resources/contrastchecker/>, (Archived on Jan. 15, 2023), 2 pgs.

"Text Legibility", Material Design, [Online]. Retrieved from the Internet: <URL: https://web.archive.org/web/20230107134917/https://m2.material.io/design/color/text-legibility.html#legibility-standards>, (Archived on Jan. 7, 2023), 16 pgs.

* cited by examiner

500

ACCESS A VIDEO PLAYBACK GUI THAT
AUTOMATICALLY PLAYS BACK A PLURALITY OF
VIDEOS IN SEQUENCE
~501

DETERMINE A CURRENT MUTE STATE OF THE
VIDEO PLAYBACK GUI
~502

CONDITIONALLY PRESENT AN INDICATOR THAT
VISUALLY INFORMS A USER THAT AUDIO IS
CURRENTLY IN THE ENABLED MUTE STATE
WHILE AN INDIVIDUAL VIDEO IS BEING PLAYED
BACK BASED ON THE CURRENT MUTE STATE
~503

700

710

VIDEO PLAYACK

▷9.5k
@justine
Know Your Worth

API CALLS
908

MESSAGES
912

VIDEO SOUND CONTROL

TECHNICAL FIELD

The present disclosure relates generally to presenting videos on mobile devices.

BACKGROUND

Modern day user devices are used by users to consume videos throughout the day. Often users consume such videos without audio to avoid disrupting other people in their surroundings. While most videos that users consume can be enjoyed without audio, adding subtitles to such videos enhances the user experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some examples are illustrated by way of example, and not limitation, in the figures of the accompanying drawings in which.

DETAILED DESCRIPTION

Figure 1:
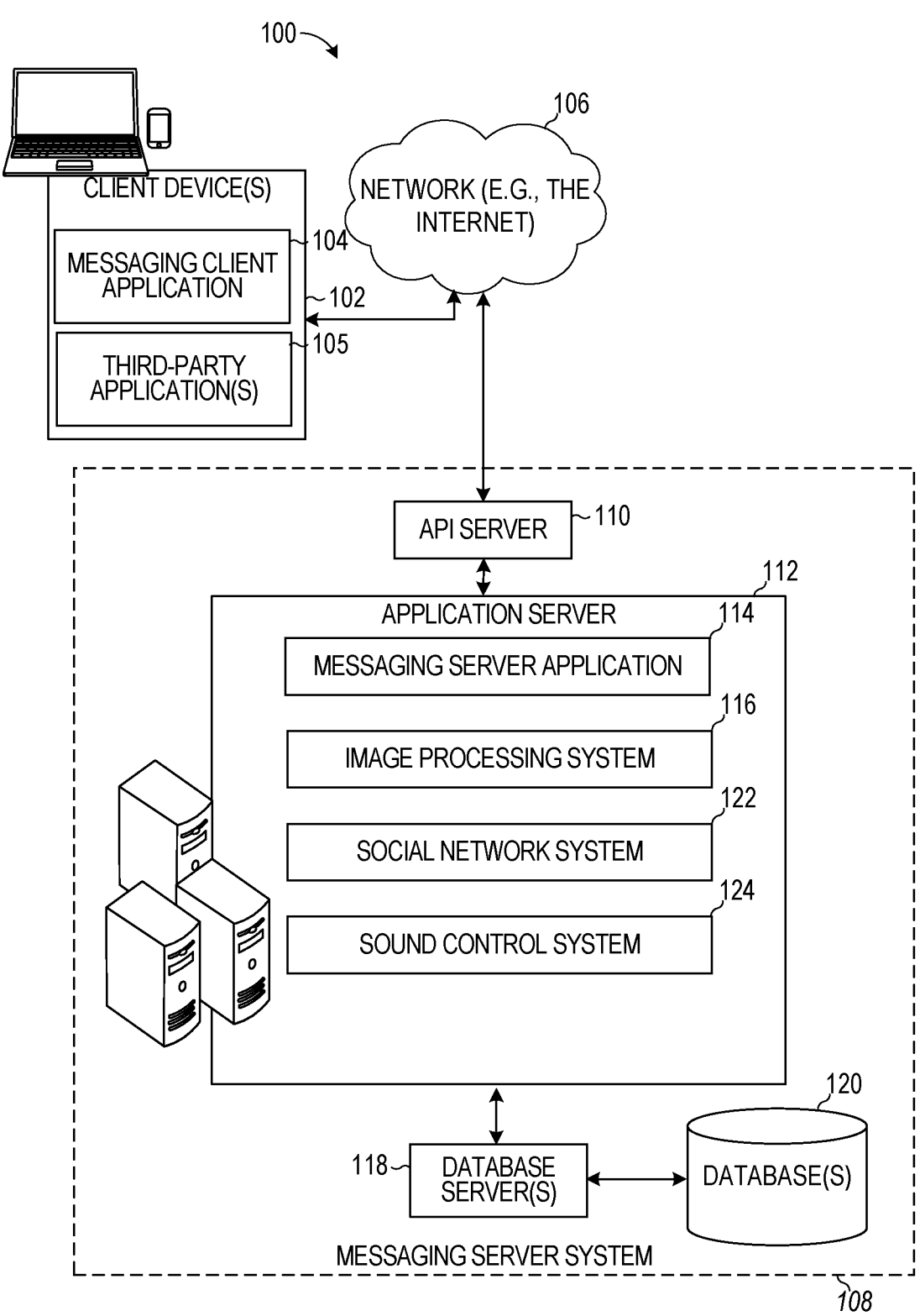
FIG. 1 is a block diagram showing an example messaging system for exchanging data (e.g., messages and associated content) over a network, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Often, users consume content, and specifically videos, on their mobile device without audio or sound. Most content the users consume can be enjoyed without sound. But in many cases, the overall enjoyment of the content can be enhanced with the output of the audio. There are many ways to control whether output of audio is enabled or not. For example, certain mobile devices include a ringer mute button that when activated (e.g., is in the mute state) prevents the output of audio associated with a ringer of the device. This ringer mute button is also used by certain applications to control the output of audio associated with some content. Namely, if the ringer mute button is activated, the applications can disable the output of audio associated with content. Other ways to control the output of audio is by using volume control keys or buttons to reduce the volume level of the audio. Sometimes users access various content-viewing applications but forget whether the ringer mute button is activated or may not recall the current volume-level setting.

In these cases, the users may be in situations where audio output is not desired or can interfere with other activities the users perform. Failing to properly handle such situations and allowing output of audio when not desired or convenient for the users can cause many distractions and create uncomfortable situations. For example, if a user starts viewing a video and the device outputs the associated audio while the ringer mute button is activated, this may not be the desirable behavior for the user. Also, the user may not be aware why the audio is being output or why audio is not being output in different situations. Users can get nervous and have to react quickly to resolve these issues. These steps place a burden on the user and make the user experience less seamless and enjoyable.

The disclosed examples improve the efficiency of using the electronic device by providing an audio control system that provides users with an additional way to control the output of audio, such as by conditionally presenting a visual indicator. In some examples, the disclosed techniques access a video playback graphical user interface (GUI) that automatically plays back a plurality of videos in sequence. The disclosed techniques determine a current mute state of the video playback GUI. A disabled mute state allows output of audio associated with the playback of the plurality of videos and an enabled mute state prevents the output of the audio associated with the playback of the plurality of videos. The disclosed techniques conditionally present an indicator that visually informs a user that audio is currently in the mute state while an individual video of the plurality of videos is being played back based on the current mute state of the GUI.

For example, if audio is currently muted, the indicator can be presented and can be selected by the user to allow the output of the audio. As another example, if audio is currently not muted and is being output, the indicator can be excluded from being presented so as to avoid cluttering the display and distracting the users. In some cases, a message can be presented to a user to explain why audio is currently being output or not being output. In this way, the disclosed examples improve the efficiency of using the electronic device by reducing the complexity a user experiences in accessing a video application. This reduces the device resources (e.g., processor cycles, memory, and power usage) needed to accomplish a task with the device.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 (also referred to as messaging client) and a third-party application 105. Each messaging client application 104 is communicatively coupled to other instances of the messaging client application 104, the third-party application 105, and a messaging server system 108 via a network 106 (e.g., the Internet).

Accordingly, each messaging client application 104 and third-party application 105 is able to communicate and exchange data with another messaging client application 104 and third-party application(s) 105 and with the messaging server system 108 via the network 106. The data exchanged between messaging client applications 104, third-party applications 105, and between a messaging client application 104 and the messaging server system 108 includes functions (e.g., commands to invoke functions) and payload data (e.g., text, audio, video, or other multimedia data). Any disclosed communications between the messaging client application 104 and the third-party application(s) 105 can be transmitted directly from the messaging client application 104 to the third-party application(s) 105 and/or indirectly (e.g., via one or more servers) from the messaging client application 104 to the third-party application(s) 105.

The third-party application(s) 105 and the messaging client application 104 are applications that include a set of functions that allow the client device 102 to access sound control system 124. The third-party application 105 is an application that is separate and distinct from the messaging client application 104. The third-party application(s) 105 are downloaded and installed by the client device 102 separately from the messaging client application 104. In some implementations, the third-party application(s) 105 are downloaded and installed by the client device 102 before or after the messaging client application 104 is downloaded and installed. The third-party application 105 is an application that is provided by an entity or organization that is different from the entity or organization that provides the messaging client application 104. The third-party application 105 is an application that can be accessed by a client device 102 using separate login credentials than the messaging client application 104. Namely, the third-party application 105 can maintain a first user account and the messaging client application 104 can maintain a second user account. For example, the third-party application 105 can be a social networking application, a dating application, a ride or car sharing application, a shopping application, a trading application, a gaming application, or an imaging application.

In some examples, the messaging client application 104 may present a user with a video graphical user interface that automatically and sequentially plays back a playlist of a plurality of videos. The videos can be provided by various users of the messaging client application 104. After a first video ends, the first video can automatically replay from the beginning or a second video can begin being played back. In some cases, the second video can begin being played back in response to an input, such as a swipe gesture, received from the user.

The video GUI may display one or more interactive representations (e.g., icons or thumbnails) that identify respective videos. The messaging client application 104 receives a user selection of a first one of the interactive representations. In response to receiving the user selection, the messaging client application 104 retrieves a first video that corresponds to the selected interactive representation and plays back or displays the video. In some cases, the first video may include a sequence of one or more video clips (e.g., 10 second video clips). The user can advance between each video clip in the video by tapping (physically touching for less than a threshold period of time (e.g., 1 second)) on the screen. In response to the user tapping on the screen, the messaging client application 104 retrieves a next video clip in the sequence. Once all of the video clips or once the first video is completely played back, a second video may be selected (e.g., by the user manually selecting a particular interactive representation or automatically by selecting a video that matches user interests). The second video may be played back and presented to the user.

In some examples, the messaging client application 104 accesses a video playback GUI that automatically plays back a plurality of videos in sequence. The messaging client application 104 determines a current mute state of the video playback GUI, where a disabled mute state allows output of audio associated with the play back of the plurality of videos, and an enabled mute state prevents the output of the audio associated with the playback of the plurality of videos. The messaging client application 104 conditionally presents an indicator that visually informs a user that audio is currently in the mute state while an individual video of the plurality of videos is being played back based on the current mute state of the GUI.

In some examples, the messaging client application 104, in response to determining that the mute state is enabled when the video playback GUI is accessed, automatically presents the indicator that visually informs the user that the audio is currently in the mute state while the individual video is being played back in the mute state. The messaging client application 104 enables output of audio associated with the individual video in response to receiving, by the client device 102 during playback of the individual video, input that selects the indicator.

In some examples, the messaging client application 104 automatically plays back an additional video after playback of the individual video ends and/or in response to input received from a user, such as a swipe up/down gesture. Audio associated with the additional video is enabled for output in response to determining that the indicator, previously presented while the individual video was played back, was selected to enable the output of the audio associated with the individual video. The messaging client application 104 prevents display of the indicator while the additional video is being played back in response to determining that the indicator, previously presented while the individual video was played back, was selected to enable the output of the audio associated with the individual video.

In some examples, the messaging client application 104 changes a visual attribute (or display state) of the indicator to indicate that the output of audio has been enabled and removes the indicator from being displayed after a threshold period of time has elapsed since the indicator was selected by the input. In some aspects, the messaging client application 104 changes a visual attribute of the indicator to indicate that the output of audio has been enabled and removes the indicator from being displayed after starting to present the additional video in response to receiving the input that selects the indicator to enable the output of the audio for the individual video.

In some examples, the disabled mute state can include an unmuted state. In such cases, the messaging client application 104, in response to determining that the mute state is disabled when the video playback GUI is accessed, automatically prevents display of the indicator while the individual video is being played back in the unmuted state. In some examples, the messaging client application 104 determines a current volume level associated with the client device 102. The messaging client application 104, in response to determining that the mute state is enabled when the video playback GUI is accessed, receives input that selects a physical volume adjustment button of the client device to change the current volume level. The messaging client application 104, in response to receiving the input that selects the physical volume adjustment button of the client device, changes the mute state to the disabled mute state and outputs audio at the current volume level.

In some examples, the messaging client application 104 determines that the current volume level when the physical volume adjustment button was selected is zero. The messaging client application 104 prevents the output of audio in response to determining that the current volume level when the physical volume adjustment button was selected is zero and presents a notification indicating that the current volume level is zero. The messaging client application 104 receives additional interactions with the physical volume adjustment button to gradually increase or decrease the current volume level to control the output of audio of the individual video.

In some examples, the messaging client application 104 determines that the current volume level, when the physical volume adjustment button was selected, is zero. The messaging client application 104 sets the current volume level to a specified audible level to allow the output of audio in response to determining that the current volume level, when the physical volume adjustment button was selected, is zero.

In some examples, the messaging client application 104 determines that the current volume level, when the physical volume adjustment button was selected, is greater than zero, the current volume level having been set previous to the access of the video playback GUI. The messaging client application 104 allows the output of audio at the current volume level in such cases. In some examples, the messaging client application 104 determines the current mute state of the video playback GUI is in the enabled mute state by determining that a physical switch (e.g., a ringer mute button or switch) of the user device is set to a mute position (e.g., is activated) in which audio output of the user device is disabled. In some examples, the physical switch includes a ringer mute button.

In some examples, the messaging client application 104 determines the current mute state of the video playback GUI is in the enabled mute state by determining that a volume level of the client device has gradually been reduced until a level zero.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an API server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 and the third-party application 105 in order to invoke functionality of the application server 112. The API server 110 exposes various functions supported by the application server 112, including account registration; login functionality; the sending of messages, via the application server 112, from a particular messaging client application 104 to another messaging client application 104 or third-party application 105; the sending of media files (e.g., images or video) from a messaging client application 104 to the messaging server application 114, and for possible access by another messaging client application 104 or third-party application 105; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the sound control system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the sound control system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The sound control system 124 performs some or all of the above functions of the messaging client application 104. For example, the sound control system 124 conditionally presents the indicator to inform a user about the mute status or state of the client device 102 if the client device 102 is currently muted. This can be performed in response to the sound control system 124 determining that the video playback GUI has been accessed initially. Video playback GUI refers to the GUI of the messaging client application 104 or feature of the messaging client application 104 in which random or customized and recommended videos are presented to a user sequentially in an automated or semi-automated manner.

The application server 112 is communicatively coupled to a database server 118, which facilitates access to a database 120 in which is stored data associated with messages processed by the messaging server application 114. Database 120 may be a third-party database. For example, the application server 112 may be associated with a first entity, and the database 120 or a portion of the database 120 may be associated and hosted by a second, different entity. In some implementations, database 120 stores user data that the first entity collects about each of the users of a service provided by the first entity. For example, the user data includes user names, passwords, addresses, friends, activity information, preferences, videos or content consumed by the user, and so forth.

Figure 2:
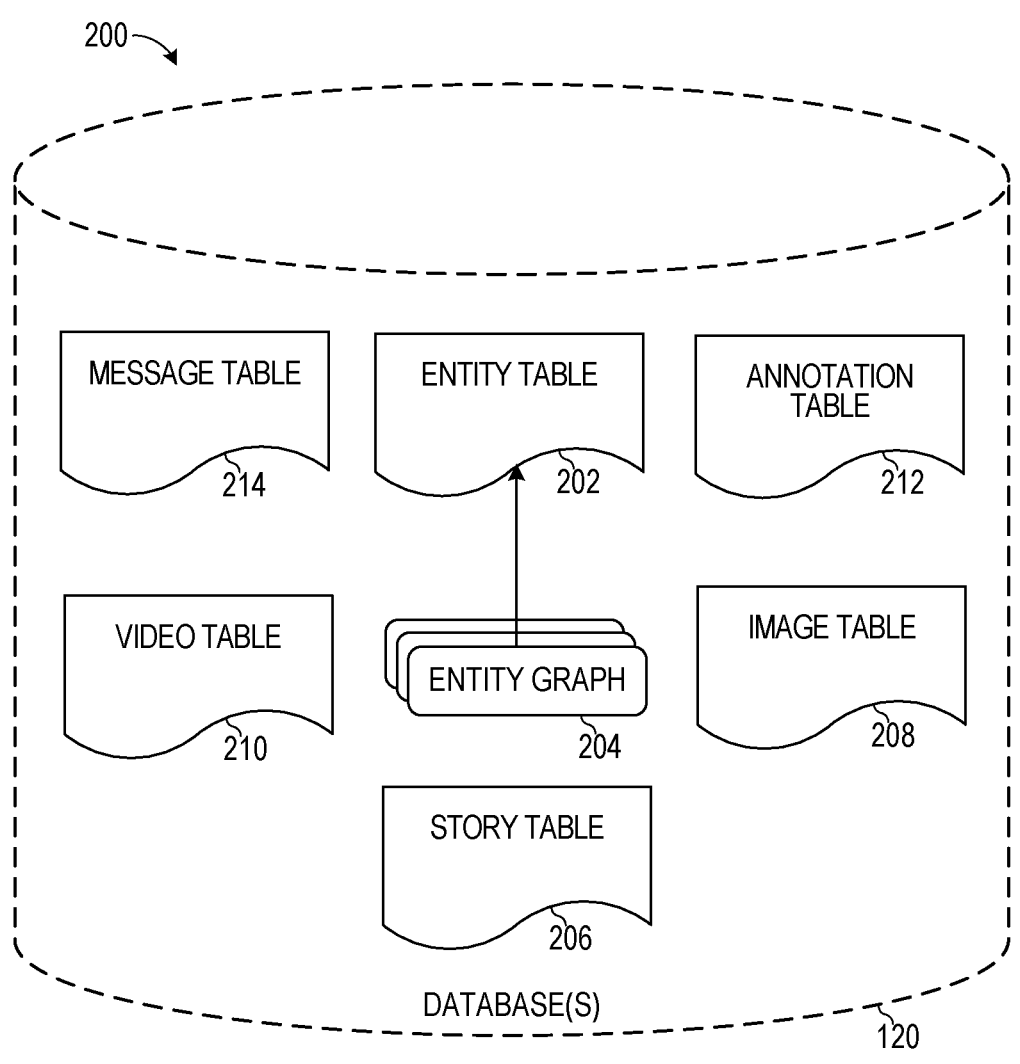
FIG. 2 is a schematic diagram illustrating data which may be stored in the database of a messaging server system, according to some examples.

FIG. 2 is a schematic diagram 200 illustrating data, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one example, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

Figure 3:
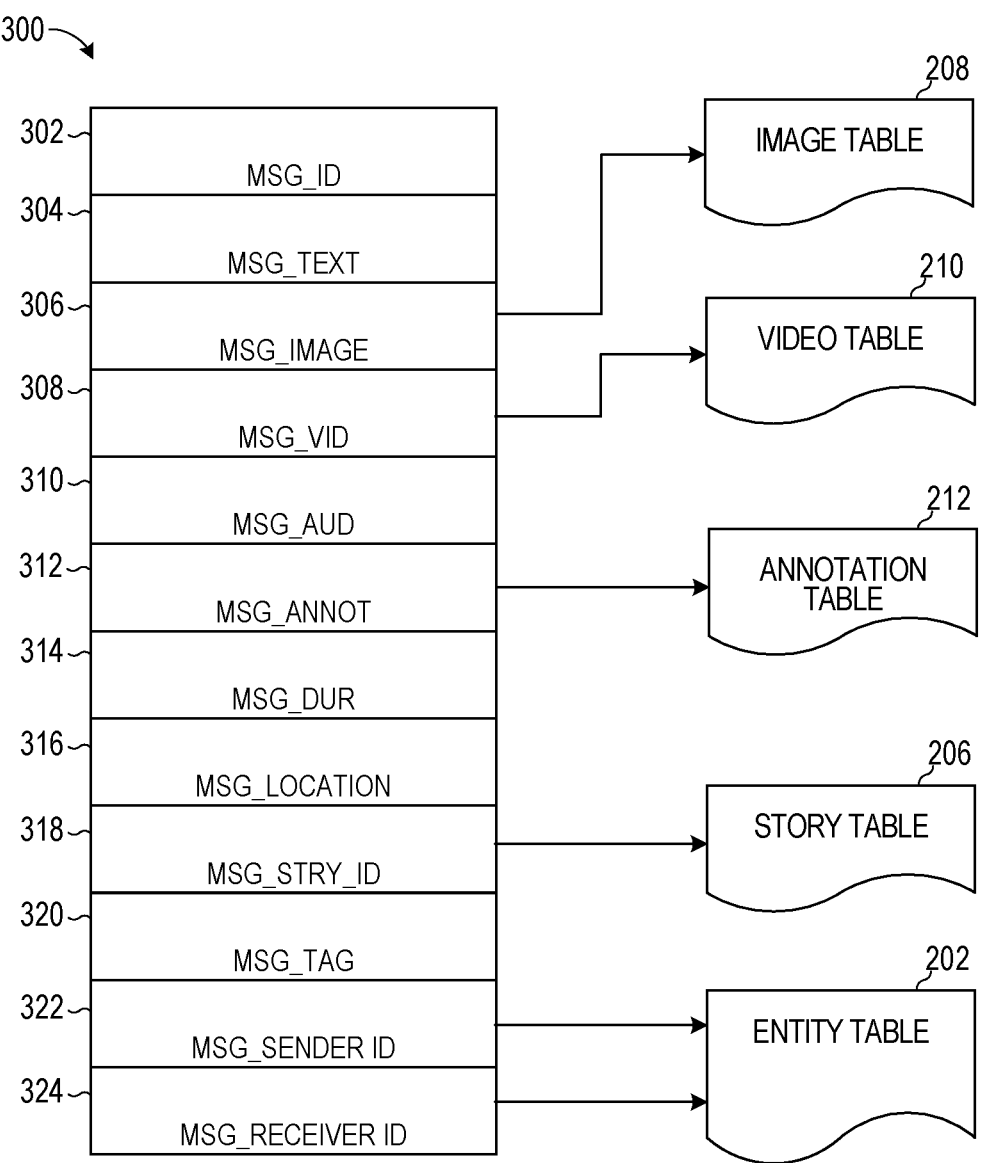
FIG. 3 is a schematic diagram illustrating a structure of a message generated by a messaging client application for communication, according to some examples.

FIG. 3 is a schematic diagram illustrating a structure of a message 300, according to some examples, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
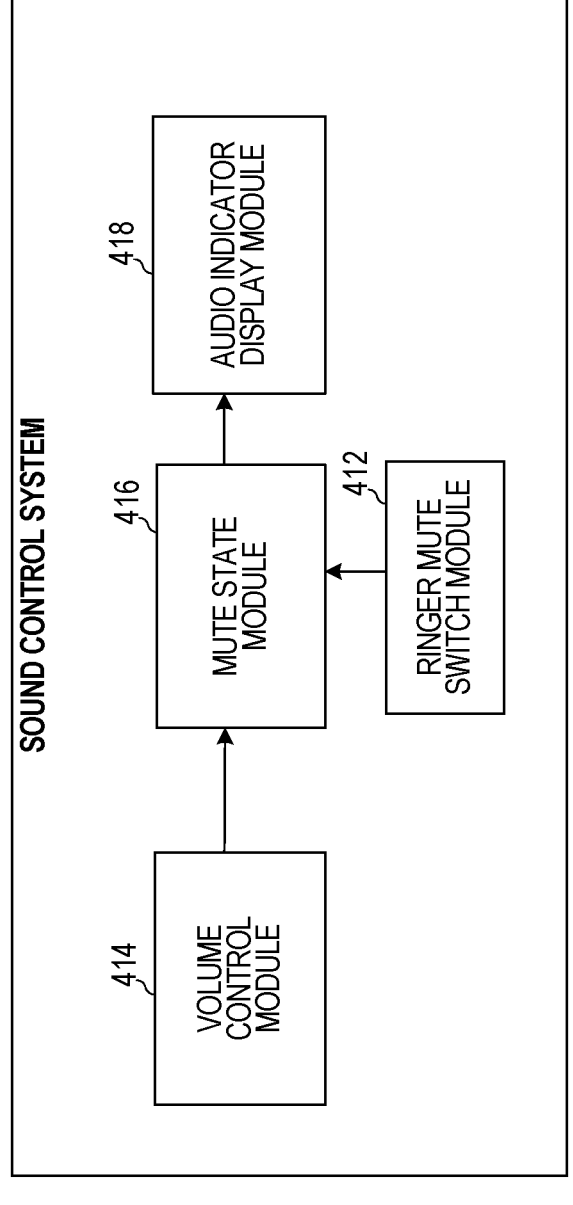
FIG. 4 is a block diagram showing an example audio control system, according to some examples.

FIG. 4 is a block diagram showing an example sound control system 124, according to examples. Sound control system 124 includes a volume control module 414, a mute state module 416, a ringer mute switch module 412, and an audio indicator display module 418.

Volume control module 414 continuously (or in response to detecting activation of a volume button) monitors volume controls of a user device (e.g., client device 102). The volume controls may include physical volume UP/DOWN buttons on the user device. In some cases, the volume control module 414 monitors the volume controls when a video is being played back by the messaging client application 104, such as in a video playback GUI. In some examples, the volume control module 414 may only monitor the volume controls when the physical mute switch (e.g., ringer mute switch) of the user device is in the enabled position (e.g., is activated) as determined by the ringer mute switch module 412.

The volume control module 414 can detect activation of a volume UP/DOWN button on the user device (e.g., while a video is being played back in the video playback GUI). The volume control module 414 communicates the activation of the UP/DOWN button to the mute state module 416. The mute state module 416 communicates with the ringer mute switch module 412 to determine whether the ringer mute button is currently activated (indicating that the ringer is turned OFF, preventing audio associated with a ringer from being output) or de-activated (indicating that the ringer is turned ON, allowing audio associated with the ringer to be output). Based on one or both (the volume level set by the UP/DOWN button and/or the ringer mute switch state), the mute state of the client device 102 is determined by the mute state module 416. These operations can be performed when the video playback GUI is initially accessed and starts playing back a first video.

The mute state module 416 indicates the current mute state of the client device 102 to the audio indicator display module 418. The audio indicator display module 418 can present the indicator that visually informs a user that audio is currently in the mute state while an individual video of the plurality of videos is being played back based on the current mute state of the GUI.

In some cases, the audio indicator display module 418 automatically presents the indicator that visually informs the user that the audio is currently in the mute state while the individual video is being played back in the mute state. The audio indicator display module 418 enables output of audio associated with the individual video in response to receiving, by the client device 102 during playback of the individual video, input that selects the indicator. The audio indicator display module 418 automatically plays back an additional video after playback of the individual video ends. The audio indicator display module 418 enables audio associated with the additional video for output in response to determining that the indicator, previously presented while the individual video was played back, was selected to enable the output of the audio associated with the individual video. The audio indicator display module 418 prevents display of the indicator while the additional video is being played back in response to determining that the indicator, previously presented while the individual video was played back, was selected to enable the output of the audio associated with the individual video.

The audio indicator display module 418 changes a visual attribute of the indicator (e.g., displays a different icon or changes a color or style of the indicator) to indicate that the output of audio has been enabled. The audio indicator display module 418 removes the indicator from being displayed after a threshold period of time has elapsed since the indicator was selected by the input. In some cases, the audio indicator display module 418 removes the indicator from being displayed. This may occur after starting to present the additional video in response to receiving the input that selects the indicator to enable the output of the audio for the individual video.

In some examples, the audio indicator display module 418 determines a current volume level of the client device 102 when a video is displayed and played back by the video playback GUI. The audio indicator display module 418 can also determine that the ringer mute switch is activated. In such cases, audio associated with the video being played back is muted and prevented from being output. The audio indicator display module 418 can receive input that presses a volume UP or DOWN button one time. In such cases, the audio indicator display module 418 does not change the current volume level. Instead, the audio indicator display module 418 can display the indicator or message indicating to the user that the volume is currently set to zero or an inaudible level. The audio indicator display module 418 can receive additional selections of the volume UP or DOWN button and at this point can raise or lower the volume to an audible level.

In some cases, the audio indicator display module 418 outputs audio associated with a currently displayed video at a volume previously set and stored in the client device 102 by the operating system or another application. The audio indicator display module 418 can receive a first button press of the volume UP/DOWN button and may not output audio at the currently stored volume level. Once the volume UP/DOWN is pressed again, the audio indicator display module 418 outputs audio at the previously set level, such as 50% level.

Figure 5:
FIG. 5 is a flowchart illustrating example operations of the audio control system, according to some examples.
Figure 5:
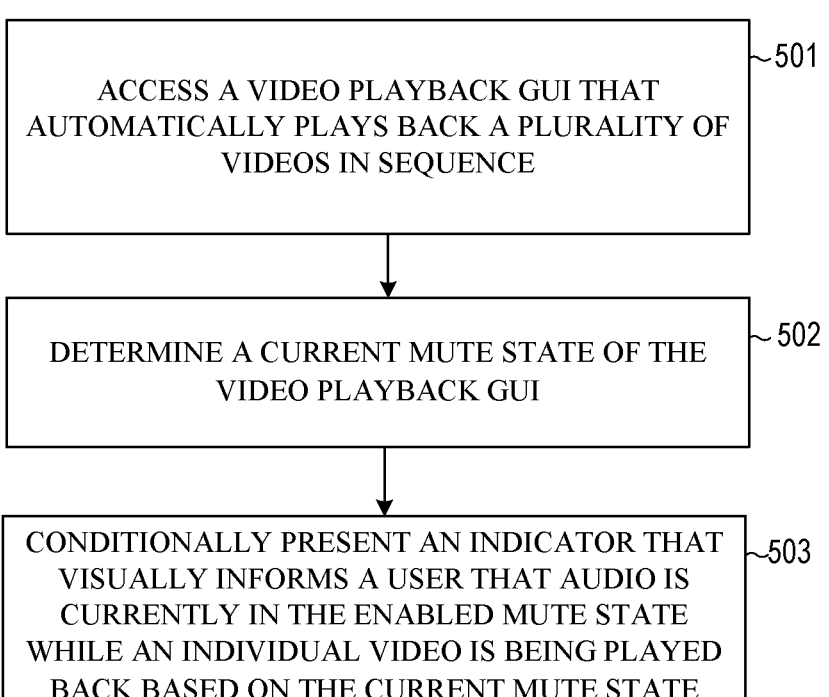

FIG. 5 is a flowchart illustrating example operations of the sound control system 124 in performing process 500, according to some examples. The process 500 may be embodied in computer-readable instructions for execution by one or more processors such that the operations of the process 500 may be performed in part or in whole by the functional components of the messaging server system 108 and/or third-party application 105; accordingly, the process 500 is described below by way of example with reference thereto. However, in other examples, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the sound control system 124 accesses a video playback graphical user interface (GUI) that automatically plays back a plurality of videos in sequence.

At operation 502, the sound control system 124 determines a current mute state of the video playback GUI, a disabled mute state allowing output of audio associated with the playback of the plurality of videos, and an enabled mute state preventing the output of the audio associated with the playback of the plurality of videos.

At operation 503, the sound control system 124 conditionally presents an indicator that visually informs a user that audio is currently in the enabled mute state while an individual video of the plurality of videos is being played back based on the current mute state of the GUI.

Figure 6:
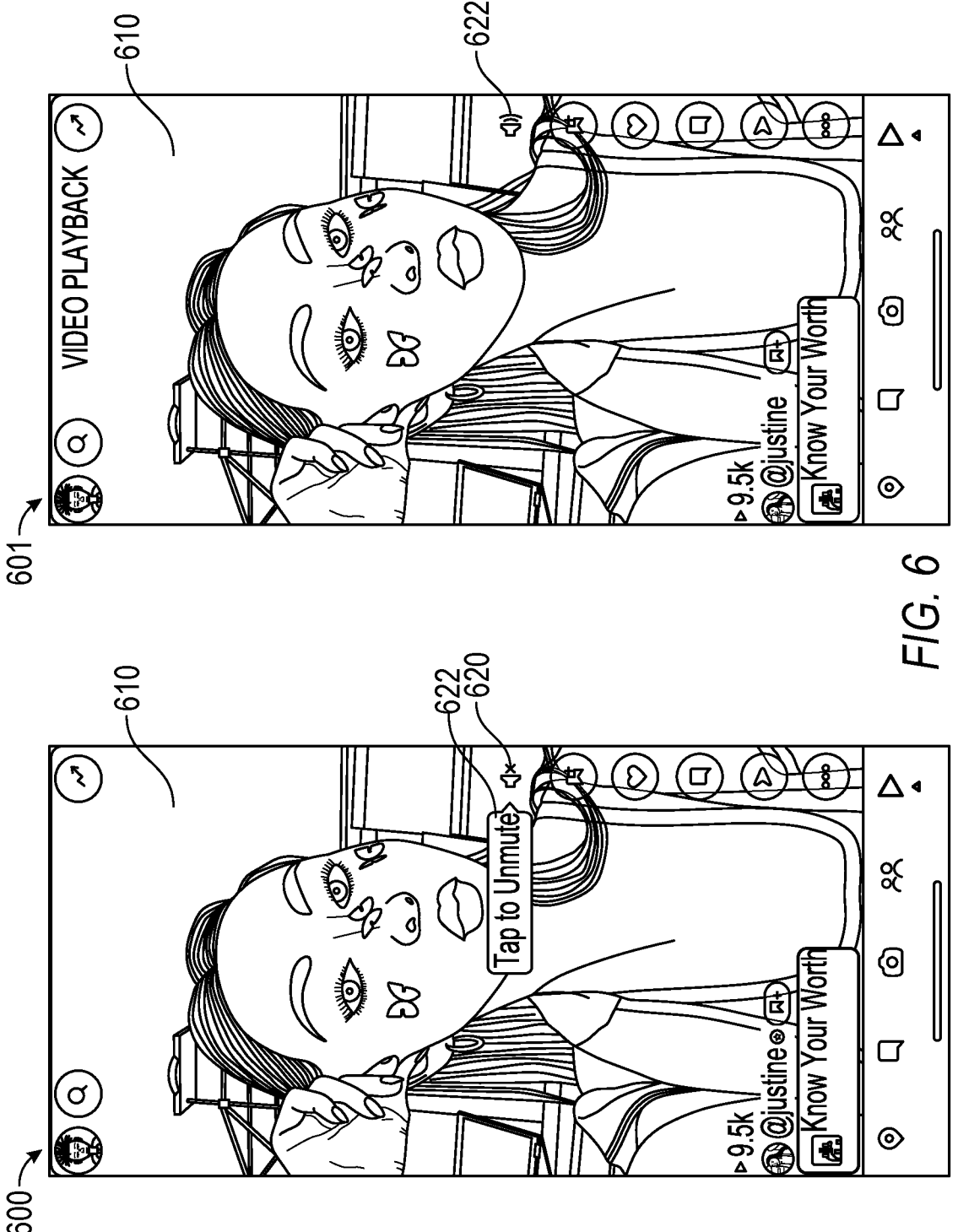
FIGS. 6-7 are illustrative inputs and outputs of the audio control system, according to some examples.
Figure 7:

FIGS. 6 and 7 are illustrative inputs and outputs of the sound control system 124, according to examples. As shown in FIG. 6, a user interface 600 is initially accessed and displayed when a user launches the video playback GUI of the messaging client application 104. The user interface 600 presents a first video 610 in a playback sequence. The user interface 600 determines that the current mute state of the client device 102 is muted (e.g., because the volume level is set to zero and/or the ringer mute button is activated, preventing audio associated with a ringer from being output). In such cases, the user interface 600 presents an indicator 620.

The indicator 620 visually informs the user that audio is currently muted, such as by presenting a message 622 (e.g., including the text "Tap to Unmute") informing the user or instructing the user to select or tap the indicator 620 to unmute and allow audio associated with the current video to be output. As shown in user interface 601, in response to receiving input that selects the indicator 620, the sound control system 124 changes a visual attribute of the indicator 620 to inform the user that audio is no longer muted and is now being output. For example, the sound control system 124 presents the indicator 622 which has different visual properties (e.g., is a different icon) than the indicator 620 presented in user interface 600.

In some cases, in response to receiving input that selects the indicator 620, audio associated with the first video 610 is presented at the current volume level. If the current volume level is zero or is at an inaudible level, the user interface 600 presents a notification or message informing the user that audio is not being output because the volume level is set to zero. In such cases, the user can press the volume UP button to raise the volume to an audible level. In some cases, the volume is automatically raised to an audible level from zero in response to receiving a second selection of the volume UP button following the first selection of the volume UP button or selection of the indicator 620. In some cases, in response to receiving input that selects the indicator 620, audio associated with the first video 610 is presented at an audible level if the current volume level is zero. Namely, if the current volume level is zero or is at an inaudible level, the user interface 600 presents a notification or message informing the user that audio is muted but is output at an audible level automatically.

When a subsequent video is presented and/or after a threshold period of time, the indicator 622 is removed from display. For example, as shown in the user interface 700, a second video 710 that sequentially follows the first video 610 is presented. The second video 710 is automatically presented with the audio being output even though the ringer mute button is activated and the volume level is set to zero. This is because the indicator 620 was previously activated or selected when the first video 610 was presented to unmute the first video 610. If the indicator 620 was not previously activated or selected, the second video 710 and the first video 610 continue playing back in a muted state without audio being output. In such cases, the second video 710 is presented without the indicator 620 being presented. In order to mute the volume again, the user needs to select the volume DOWN button to gradually reduce the volume to the inaudible level.

Figure 8:
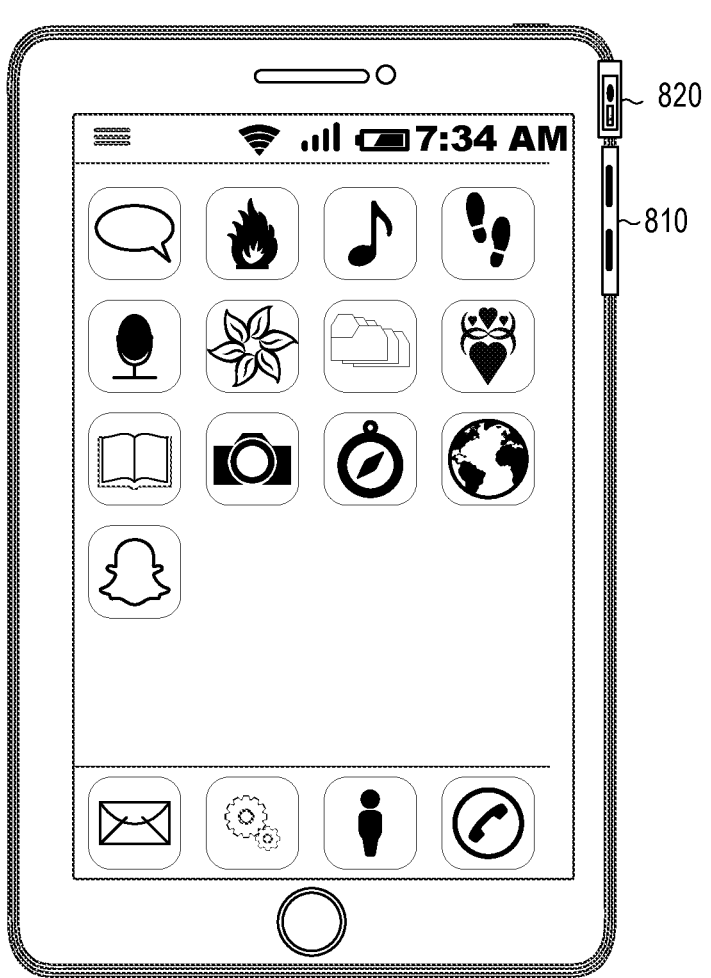
FIG. 8 shows an illustrative mobile user device or client device that employs the audio control system, according to some examples.

FIG. 8 shows an illustrative mobile device 800 that employs the sound control system 124, according to examples. Mobile device 800 includes a physical mute switch 820 (e.g., ringer mute switch) and physical volume controls 810 (that include a volume UP button or key and a volume DOWN button or key). Physical mute switch 820 can be physically moved between two positions (or can be springloaded), a mute position (activated position) and an unmute position (de-activated position). The mute position disables audio output of the mobile device 800 but can be overridden by pressing a volume UP button while viewing some content. In such cases, audio of the content is presented to the user along with audio of subsequent content. Volume controls 810 include a volume DOWN button. Selecting or pressing the volume DOWN button a number of times gradually reduces a volume level of the mobile device 800 (e.g., by a certain predetermined amount each time the volume DOWN button is pressed). The volume is reduced by pressing the volume DOWN button enough times to reach a mute state (in which the volume level is set to 0%).

Figure 9:
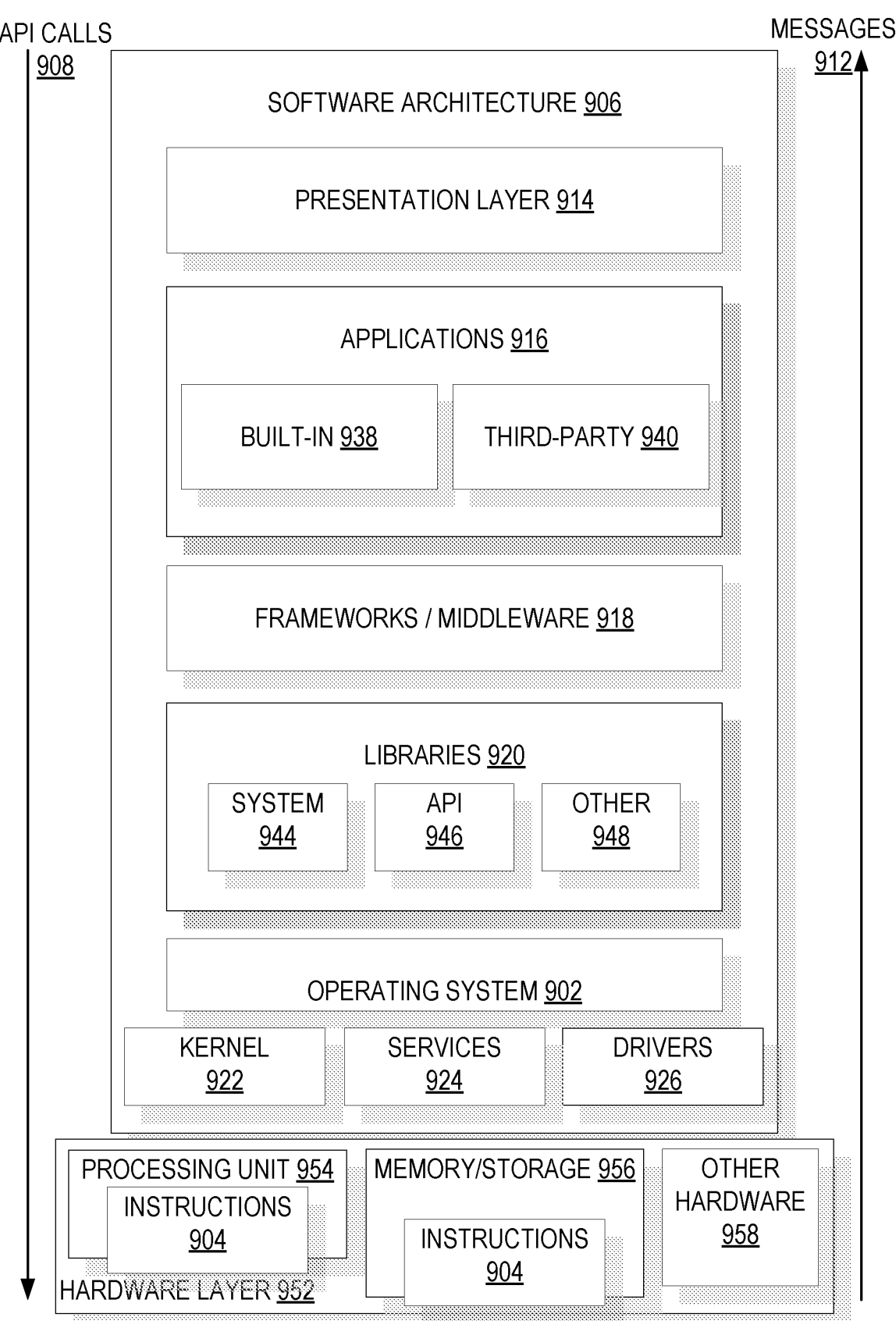
FIG. 9 is a block diagram illustrating a representative software architecture, which may be used in conjunction with various hardware architectures herein described, according to some examples.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
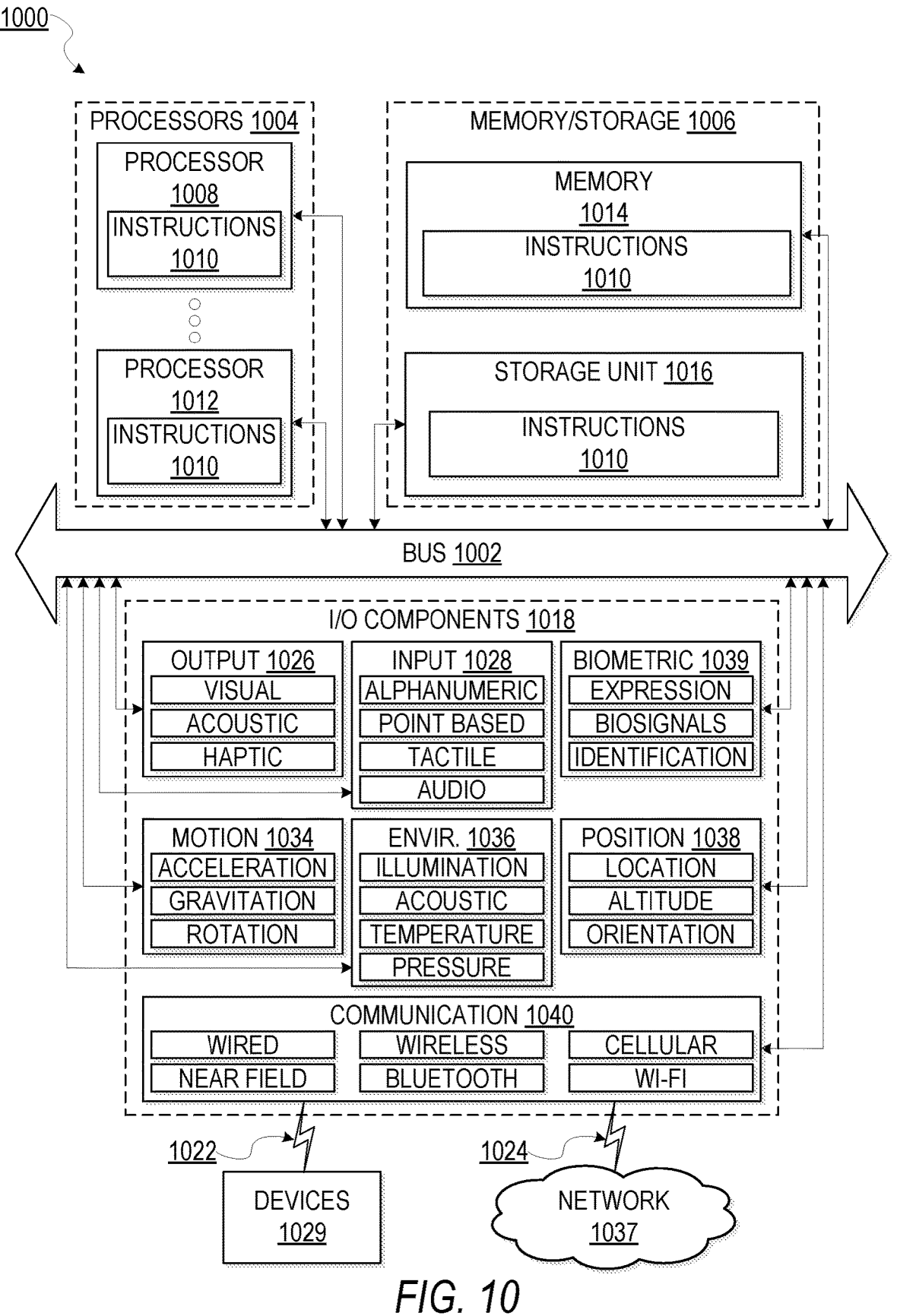
FIG. 10 is a block diagram illustrating components of a machine able to read instructions from a machine-readable medium (e.g., a machine-readable storage medium) and perform any one or more of the methodologies discussed herein, according to some examples.

FIG. 10 is a block diagram illustrating components of a machine 1000, according to some examples, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative examples, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various examples, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further examples, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
accessing, by one or more processors of a device, a video playback graphical user interface (GUI) that causes playback of a plurality of videos in sequence;
selectively presenting an indicator that visually informs a user that audio is currently in an enabled mute state while an individual video of the plurality of videos is being played back, the enabled mute state preventing output of the audio associated with the playback of the plurality of videos;
in response to determining that the audio is in the enabled mute state when the video playback GUI is accessed, detecting input that selects a physical volume adjustment button of the device to change a current volume level;
in response to detecting the input that selects the physical volume adjustment button of the device, changing the enabled mute state to a disabled mute state and outputting audio associated with the individual video at the current volume level;
playing back an additional video after playback of the individual video, wherein audio associated with the additional video is enabled for output based on the detecting of the input for changing the enabled mute state to the disabled mute state; and
outputting the audio associated with the individual video at the current volume level.

2. The method of claim 1, further comprising:
determining a current mute state of the video playback GUI, a disabled mute state allowing output of audio associated with the playback of the plurality of videos; and
in response to determining that the current mute state is enabled, automatically presenting the indicator that visually informs the user that the audio is currently in the enabled mute state while the individual video is being played back in the enabled mute state.

3. The method of claim 1, further comprising:
in response to determining that a current mute state is enabled, automatically presenting the indicator that visually informs the user that the audio is currently in the enabled mute state while the individual video is being played back in the enabled mute state.

4. The method of claim 1, further comprising:
changing a visual attribute of the indicator to indicate that the output of audio has been enabled; and
removing the indicator from being displayed after a threshold period of time has elapsed since the indicator was selected by the input.

5. The method of claim 1, further comprising:
changing a visual attribute of the indicator to indicate that the output of audio has been enabled; and
removing the indicator from being displayed after starting to present the additional video in response to receiving the input that selects the indicator to enable the output of the audio for the individual video.

6. The method of claim 1, a disabled mute state comprising an unmuted state, further comprising:
in response to determining that a current mute state is disabled when the video playback GUI is accessed, automatically preventing display of the indicator while the individual video is being played back in the unmuted state.

7. The method of claim 1, further comprising:
determining the current volume level associated with the device, wherein the indicator is interactively selectable to enable output of the audio.

8. The method of claim 7, further comprising:
determining that the current volume level when the physical volume adjustment button was selected is zero; and
preventing the output of audio in response to determining that the current volume level when the physical volume adjustment button was selected is zero and presenting a notification indicating that the current volume level is zero.

9. The method of claim 8, further comprising:
receiving additional interactions with the physical volume adjustment button to gradually increase or decrease the current volume level to control the output of audio of the individual video.

10. The method of claim 7, further comprising:
determining that the current volume level when the physical volume adjustment button was selected is zero; and
setting the current volume level to a specified audible level to allow the output of audio in response to determining that the current volume level when the physical volume adjustment button was selected is zero.

11. The method of claim 7, further comprising:
determining that the current volume level when the physical volume adjustment button was selected is greater than zero, the current volume level having been set previous to accessing the video playback GUI; and
allowing the output of audio at the current volume level.

12. The method of claim 1, further comprising:
determining a current mute state of the video playback GUI is in the enabled mute state by determining that a physical switch of the device is set to a mute position in which audio output of the device is disabled.

13. The method of claim 12, wherein the physical switch comprises a ringer mute button.

14. The method of claim 1, comprising determining that a current mute state of the video playback GUI is in the enabled mute state in response to determining that a volume level of the device has gradually been reduced until a level zero.

15. A system comprising:
at least one processor of a device programmed to perform operations comprising:
accessing a video playback graphical user interface (GUI) that causes playback of a plurality of videos in sequence;
selectively presenting an indicator that visually informs a user that audio is currently in an enabled mute state while an individual video of the plurality of videos is being played back, the enabled mute state preventing output of the audio associated with the playback of the plurality of videos;
in response to determining that the audio is in the enabled mute state when the video playback GUI is accessed, detecting input that selects a physical volume adjustment button of the device to change a current volume level;

in response to detecting the input that selects the physical volume adjustment button of the device, changing the enabled mute state to a disabled mute state and outputting audio associated with the individual video at the current volume level;

playing back an additional video after playback of the individual video, wherein audio associated with the additional video is enabled for output based on the detecting of the input for changing the enabled mute state to the disabled mute state; and outputting the audio associated with the individual video at the current volume level.

16. The system of claim 15, wherein the video playback GUI automatically plays back the plurality of videos in the sequence.

17. The system of claim 15, the operations further comprising:

preventing display of the indicator while the additional video is being played back in response to determining that the indicator, previously presented while the individual video was played back, was selected to enable the output of the audio associated with the individual video.

18. A non-transitory machine-readable storage medium that includes instructions that, when executed by one or more processors of a device, cause the device to perform operations comprising:

accessing a video playback graphical user interface (GUI) that causes playback of a plurality of videos in sequence;

selectively presenting an indicator that visually informs a user that audio is currently in an enabled mute state while an individual video of the plurality of videos is being played back, the enabled mute state preventing output of the audio associated with the playback of the plurality of videos;

in response to determining that the audio is in the enabled mute state when the video playback GUI is accessed, detecting input that selects a physical volume adjustment button of the device to change a current volume level;

in response to detecting the input that selects the physical volume adjustment button of the device, changing the enabled mute state to a disabled mute state and outputting audio associated with the individual video at the current volume level;

playing back an additional video after playback of the individual video, wherein audio associated with the additional video is enabled for output based on the detecting of the input for changing the enabled mute state to the disabled mute state; and outputting the audio associated with the individual video at the current volume level.

19. The non-transitory machine-readable storage medium of claim 18, the operations comprising:

determining a current mute state of the video playback GUI, a disabled mute state allowing output of audio associated with the playback of the plurality of videos; and in response to determining that the current mute state is enabled, automatically presenting the indicator that visually informs the user that the audio is currently in the enabled mute state while the individual video is being played back in the enabled mute state.

20. The non-transitory machine-readable storage medium of claim 18, the operations comprising in response to determining that a current mute state is enabled, automatically presenting the indicator that visually informs the user that the audio is currently in the enabled mute state while the individual video is being played back in the enabled mute state.

* * * * *